(12) United States Patent
Tiwari et al.

(10) Patent No.: US 12,463,999 B2
(45) Date of Patent: *Nov. 4, 2025

(54) SYSTEM AND METHOD FOR DEVICE HEALTH CHECK AND MONITORING USING A SECURITY APPLIANCE AS A DEFAULT GATEWAY WITH POINT-TO-POINT LINKS BETWEEN ENDPOINTS

(71) Applicant: Airgap Networks Inc., Santa Clara, CA (US)

(72) Inventors: Rajesh S. Tiwari, San Ramon, CA (US); Satish M. Mohan, San Jose, CA (US); Ritesh R. Agrawal, San Jose, CA (US); Vinay Adavi, Sunnyvale, CA (US)

(73) Assignee: Zscaler, Inc., San Jose, CA (US)

( * ) Notice: Subject to any disclaimer, the term of this patent is extended or adjusted under 35 U.S.C. 154(b) by 267 days.

This patent is subject to a terminal disclaimer.

(21) Appl. No.: 18/341,204

(22) Filed: Jun. 26, 2023

(65) Prior Publication Data

US 2024/0430281 A1     Dec. 26, 2024

(51) Int. Cl.
*H04L 9/40*     (2022.01)

(52) U.S. Cl.
CPC ........ *H04L 63/1425* (2013.01); *H04L 63/145* (2013.01)

(58) Field of Classification Search
None
See application file for complete search history.

(56) References Cited

U.S. PATENT DOCUMENTS

| | | | |
|---|---|---|---|
| 2005/0015624 A1* | 1/2005 | Ginter | H04L 63/145 726/4 |
| 2017/0126745 A1* | 5/2017 | Taylor | H04L 63/0227 |
| 2021/0092132 A1* | 3/2021 | Bhatia | H04L 63/1433 |
| 2021/0352110 A1* | 11/2021 | Huffman | G06F 21/604 |

* cited by examiner

*Primary Examiner* — Christopher C Harris
(74) *Attorney, Agent, or Firm* — Baratta Law PLLC; Lawrence A. Baratta, Jr.

(57) ABSTRACT

A technique to monitor device health of endpoints in a VLAN is disclosed. A security appliance is set as the default gateway for intra-LAN communication. Message traffic is analyzed and anomalies are detected relative to normal message traffic that correspond to device health problems that may require service by a field technician.

21 Claims, 12 Drawing Sheets

SYSTEM AND METHOD FOR DEVICE HEALTH CHECK AND MONITORING USING A SECURITY APPLIANCE AS A DEFAULT GATEWAY WITH POINT-TO-POINT LINKS BETWEEN ENDPOINTS

CROSS REFERENCE TO RELATED APPLICATIONS

This application is a continuation-in-part of U.S. patent application Ser. No. 18/064,177, filed Dec. 9, 2022, which is a continuation-in-part of U.S. patent application Ser. No. 17/521,092, filed Nov. 8, 2021, entitled "System and Method to Detect Lateral Movement of Ransomware by Deploying a Security Appliance Over a Shared Network to Implement a Default Gateway with Point-To-Point Links Between Endpoints", which is a continuation of U.S. patent application Ser. No. 17/357,757, filed Jun. 24, 2021, now issued as U.S. Pat. No. 11,171,985 on Nov. 9, 2021, entitled "System and Method to Detect Lateral Movement of Ransomware by Deploying a Security Appliance Over a Shared Network to Implement a Default Gateway with Point-To-Point Links Between Endpoints" and a continuation of U.S. patent application Ser. No. 17/387,615, filed Jul. 28, 2021, now issued as U.S. Pat. No. 11,323,474 on May 3, 2022, entitled "System and Method for Determining Endpoint Compatibility with Subnet Prefix of All-Ones for Lateral Propagation Prevention of Ransomware", which are hereby incorporated by reference in their entirety.

FIELD OF THE INVENTION

The present disclosure generally relates to techniques for ransomware protection. More particularly, the present disclosure is related to providing lateral movement protection from Ransomware in environments such as shared VLAN environments.

BACKGROUND

Ransomware is one of the biggest threats facing the security industry today. Ransomware is a form of malware that infects computer systems. Ransomware is becoming an increasing problem in the computer/network security industry. Ransomware infects a computer system and encrypts files. A ransom is demanded in exchange for a decryption key.

Conventional enterprise security solutions have proved to be inadequate in view of the high-profile ransomware cases of large companies such as the Colonial Pipeline ransomware attack in 2021. The inadequacy of conventional enterprise security solutions is also evidenced by the fact that in 2020 51% of surveyed companies were hit by ransomware attacks.

Firewalls provide inadequate protection against ransomware attacks. In some companies, separate Virtual Local Area Networks (VLANs) are used to segment sections of a company by division as an additional layer of protection. For example, a finance department may have a separate VLAN domain than an engineering department. Or a finance department may have a different VLAN domain than a marketing department. However, this sort of segmentation of VLAN domains by departments doesn't address the problem of lateral movement of Ransomware attacks within a VLAN domain.

One of the reasons for the inadequacy of current enterprise security solutions is the difficulty of protecting against ransomware attacks within a shared VLAN based network architecture. If a device that is part of a shared VLAN broadcast domain is infected by ransomware or malware, there are very few security controls that can be implemented to prevent lateral propagation of the ransomware within the same VLAN network.

Referring to FIG. 1, a firewall 110 provides some limited protection against external ransomware attacks. However, a VLAN network also has east-west communication between endpoint devices 120 in a shared VLAN domain that is forwarded directly by the network router/switch 140. This east-west Intra-LAN communication is not visible to the network firewall 110 deployed up-stream on the network as shown in FIG. 1.

Current security solutions for lateral propagation protection of ransomware are based on endpoint protection. The drawback of these approaches is that it relies on an agent deployed on each endpoint to detect malicious ransomware processes being launched. Deploying and managing these agents is a challenge for IT organizations, and furthermore they cannot be deployed on IoT devices (such as web cameras, printers, and other devices) and are frequently not supported on older versions of operating systems.

Conventional VLAN network architectures have a potential gap in protection associated with lateral movement of ransomware between endpoint devices. Software application on endpoint devices provide only limited protection due to a variety of practical problems in managing software apps on endpoint devices and the presence of other IoT devices at endpoint devices, such as web cameras, printers, etc. There is thus a potential for ransomware to enter the VLAN network and laterally propagate to endpoint devices.

SUMMARY

In one implementation, a security appliance is set as the default gateway for intra-LAN communication for two or more endpoint devices. A subnet mask of 255.255.255.255 is used to set the security appliance as a default gateway for a plurality of endpoint devices of the shared VLAN environment. In one implementation, the security appliance is used to detect ransomware. In another implementation, the security appliance is used in combination with a management system to detect endpoint device having anomalous behavior associated with a health problem of individual endpoint devices. Alerts are generated for field technician representatives.

It should be understood, however, that this list of features and advantages is not all-inclusive, and many additional features and advantages are contemplated and fall within the scope of the present disclosure. Moreover, it should be understood that the language used in the present disclosure has been principally selected for readability and instructional purposes, and not to limit the scope of the subject matter disclosed herein.

BRIEF DESCRIPTION OF THE DRAWINGS

The present disclosure is illustrated by way of example, and not by way of limitation in the figures of the accompanying drawings in which like reference numerals are used to refer to similar elements.

DETAILED DESCRIPTION

Figure 1:
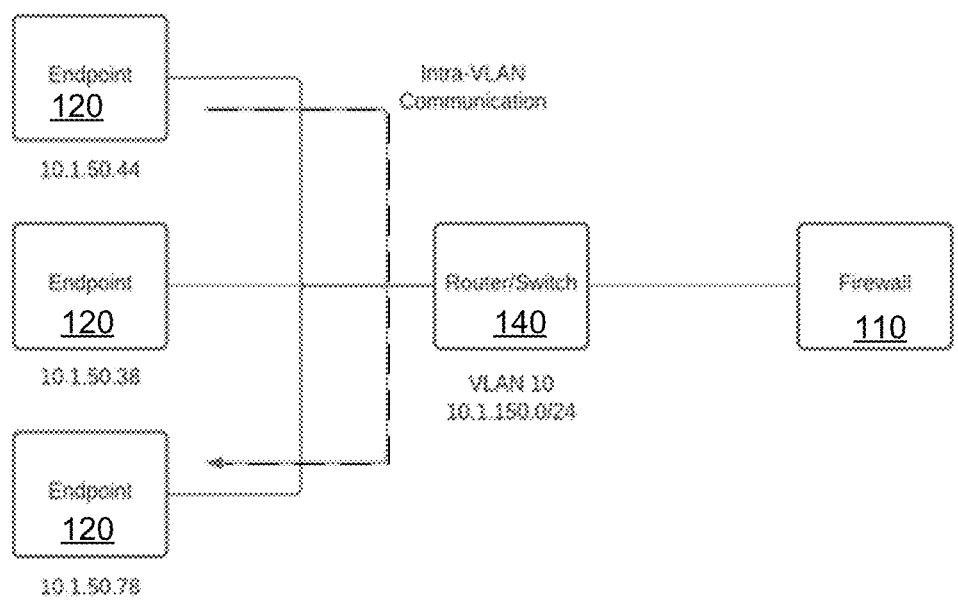
FIG. 1 is a block diagram illustrating Intra-LAN traffic in a conventional VLAN network.
Figure 2:
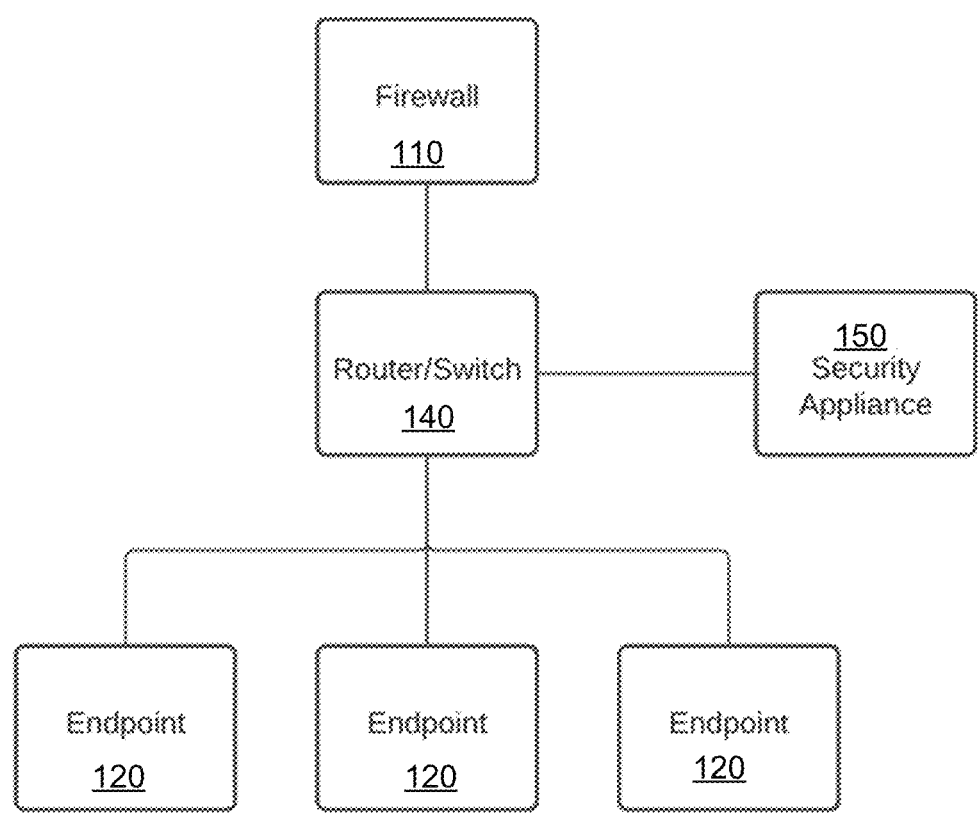
FIG. 2 is a block diagram illustrating a security appliance to provide protection from lateral movement of ransomware in accordance with an implementation.

FIG. 2 is a diagram illustrating a change to a network architecture to prevent lateral propagation of malware and ransomware. The operation of the network router/switch 140 is augmented and enhanced with a security appliance 150. The security appliance could be implemented in a variety of ways, such as using a mixture of hardware and software, firmware, etc. However, in one implementation it is implemented as software that may, for example, be stored on a memory and executed on a computer processor associated with a computing device such as the router/switch. In one implementation, it may be deployed on an existing port (e.g., an access port or a trunk port) of the VLAN network. As an illustrative example, the security appliance 150 may be implemented as software compatible with a virtual machine (VM) implementation, such as within a hypervisor implementation in VMware®. The security appliance may be deployed on a port that allows the security appliance to monitor and control the flow of message traffic across a network node for a plurality of endpoint devices with an individual VLAN domain or even across multiple VLAN domains. Deploying the security appliance on a trunk port is advantageous because a trunk port is a specific type of port on a network switch that allows data to flow across a network node for multiple virtual local area networks or VLANs. However, the security appliance could alternatively be deployed on an access port.

In one implementation, virtual point to point links between a security appliance 150 and each endpoint 120 are established in a shared VLAN domain that forces all traffic from an endpoint to traverse the security appliance 150. In one implementation, the security appliance is deployed on an access port or a trunk port on an existing router or switch.

In one implementation, the security appliance 150 becomes the default gateway and the Dynamic Host Configuration Protocol (DHCP) Relay responsible for relaying IP address requests to the DHCP function on the network and overwriting the subnet mask in the response to a subnet mask comprised of all-ones—255.255.255.255.

When an individual endpoint 120 requests an IP address, the security appliance 150 sets the security appliance as the default gateway for the endpoint. In one implementation, the security appliance responds with a subnet comprised of all-ones—255.255.255.255—and sets itself as the default gateway for the endpoint. Since the endpoint receives an IP address with a subnet mask of 255.255.255.255, any network communication with other endpoints or internet applications needs to be routed via the default gateway. In other words, a network with a subnet mask of 255.255. 255.255 puts each device inside its own subnet, which forces them to communicate with the default gateway before communicating with any other device. The 255.255. 255.255 subnet mask may also be referred to by the Classless Inter-Domain Routing (CIDR) prefix /32, which has one IP address. The CIDR number comes from the number of ones in the subnet mask when converted to binary. The 255.255.255.255 subnet mask corresponds to a CIDR prefix of /32.

Since the security appliance 150 sets itself as the default gateway for the network (by virtue of the subnet mask being comprised of all-ones), any East-West communication between different endpoints 120 and communication between an endpoint 120 and other endpoints 120 or applications on different networks will be routed via it. This provides the security appliance with the unique ability to allow only authorized communication and disallow everything else.

Figure 3:
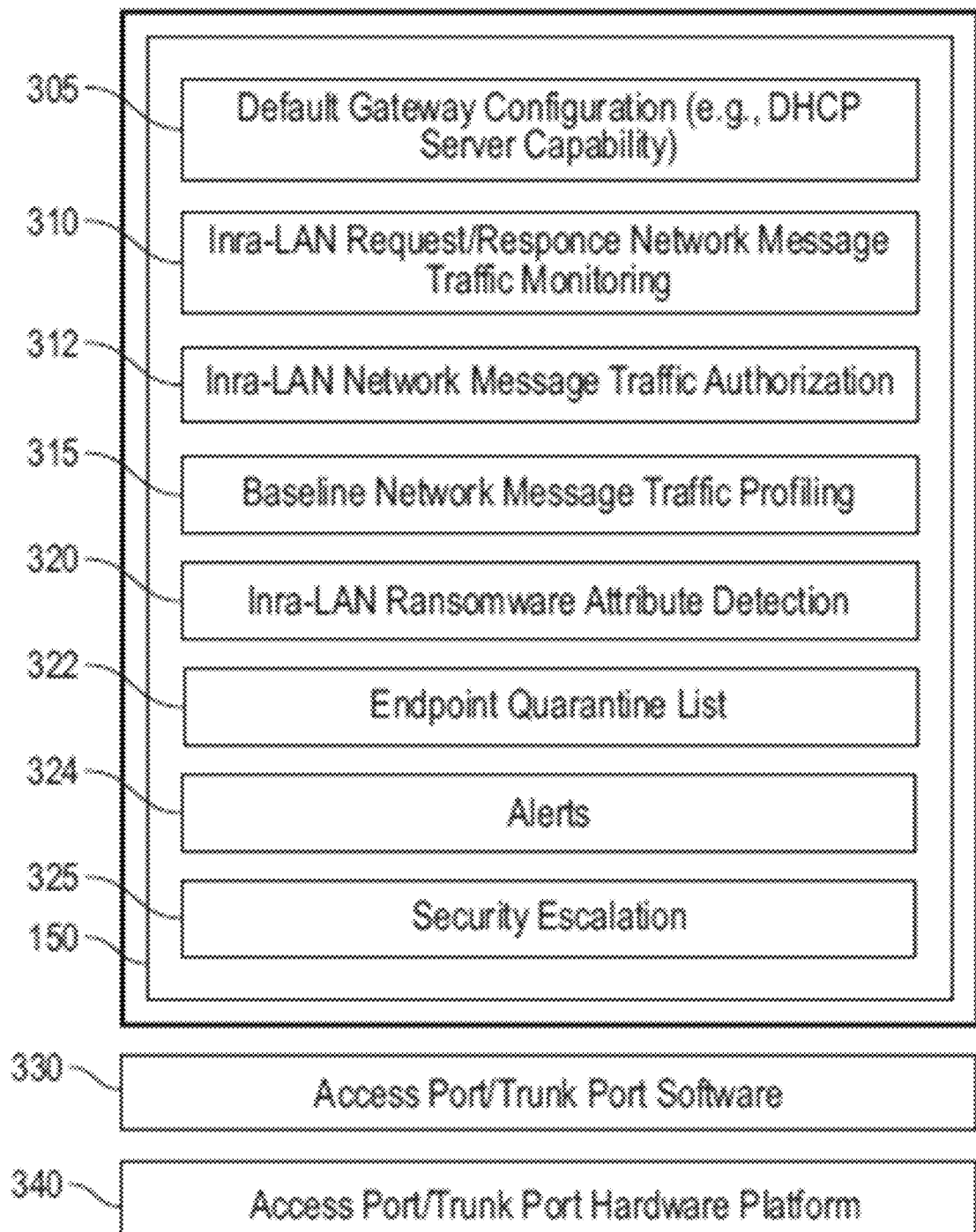
FIG. 3 is a block diagram illustrating components of a security appliance in accordance with an implementation.

FIG. 3 is a high-level diagram illustrating major functional blocks of the security appliance in one implementation. As previously discussed, the security appliance 150 may be deployed in an access port or in a trunk port associated with VLANs for a number of different endpoint devices (e.g., different laptop computers in a VLAN domain). It thus may be implemented as software stored on a computer memory and executable by a processor associated with an access port or a trunk port. For example, it may be implemented as software deployed with the software 330 and hardware 340 environment associated with an access port or a trunk port. In the example of FIG. 3, the security appliance 150 includes a default gateway configuration unit 305 to set the security appliance as a default gateway as described above (e.g., using a subnet mask of 255.255.255.255). An intra-LAN traffic monitoring unit 310 monitors intra-LAN traffic. This can include monitoring both request and response messages in intra-LAN traffic and detecting irregularities in intra-LAN request/response message traffic. An Intra-LAN network message traffic authorization unit 312 allows only authorized communication between the plurality of endpoint devices of the shared VLAN environment. For example, it may block unauthorized communication between endpoints. A baseline traffic profiling unit 315 may be optionally included to develop a baseline profile for typical or normal intra-LAN message traffic patterns between endpoint device 120. For example, the presence of ransomware may generate unusual amounts or types of traffic in comparison to a baseline profile. An Intra-LAN ransomware attribute detection unit 320 determines if one or more intra-LAN messages have computer code indicative of ransomware, such as computer code files to implement file scanning and encryption.

In the example of FIG. 3, the security appliance includes an endpoint quarantine unit 322 to quarantine compromised endpoints. This may include, for example, generating a list of quarantined endpoint devices that are used to block intra-LAN communication for compromised devices (i.e., to stop the lateral movement of ransomware). An alert unit 324 may be included to generate automated alerts, such as generating alerts for an administrator of an attempted ransomware attack. An optional security escalation unit 325 may be included to implement a security escalation protocol to increase security.

It will be understood that while the security appliance 150 may be deployed on an existing VLAN system, in some implementations it may also be incorporated into new VLAN system components, such as being incorporated into an access port or a trunk port.

Figure 4:
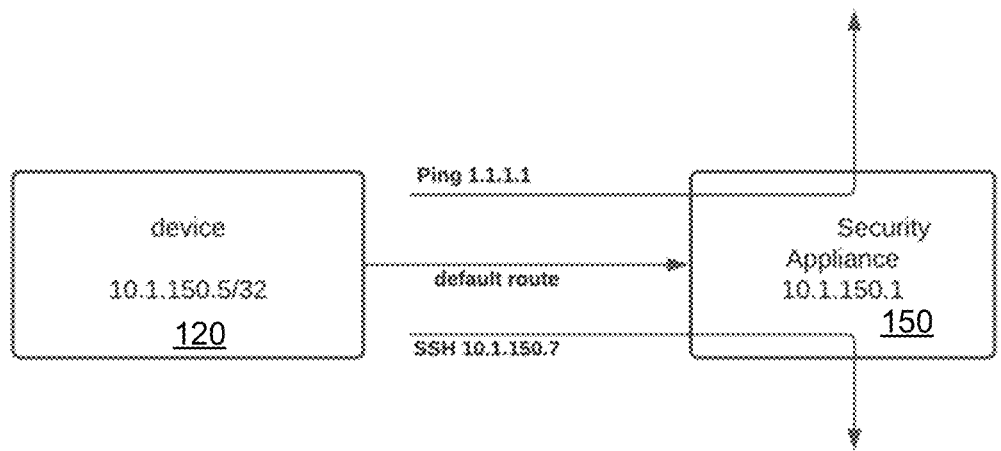
FIG. 4 illustrates the security appliance set as the default gateway in accordance with an implementation.

From the perspective of the endpoint 120, other endpoints and applications appear to be in a different IP network. Hence all outbound packets are sent to the default gateway as shown in FIG. 4. In this example, a /32 subnet is illustrated. However, more generally, a /31 or a /30 subnet may be used. Configuring a /32 subnet mask on endpoints forces all outbound network traffic via the security appliance 150. The security appliance 150 allows only authorized communication between endpoints, thereby significantly reducing the attack surface and lateral propagation by malware and ransomware. Detecting attempts by malicious actors to circumvent the protection provided by the security appliance permits quarantining devices which attempt to do so. Rapid quarantining of compromised endpoint devices stops the lateral propagation of ransomware. This, in turn, reduces the spread and potential damage of a ransomware attack.

Figure 5:
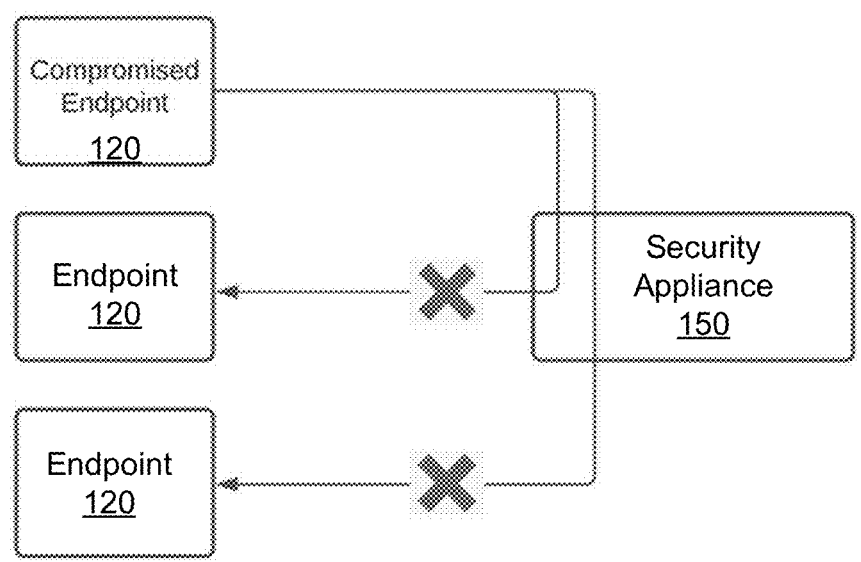
FIG. 5 illustrates how a security appliance may quarantine a compromised endpoint in accordance with an implementation.

FIG. 5 is a high-level block diagram illustrating an example of how lateral propagation of ransomware is prevented in accordance with an implementation. In this example, a compromised endpoint is infected with ransomware. The ransomware may, for example, have entered the compromised endpoint in a variety of different ways, such as through a peripheral IoT device in communication with the compromised endpoint.

Regardless of how the compromised endpoint became infected with ransomware, the security appliance 150 was earlier set as the default gateway. The security appliance 150 monitors message traffic and quarantines suspicious traffic from the compromised endpoint to other endpoints. This may include, for example, detecting message traffic that has attributes associated with ransomware, such as computer code for file scanning or encryption. It may also optionally include, in some implementations, detecting that message traffic that is unusual in comparison to a baseline profile of normal message traffic.

It is possible that ransomware in a compromised endpoint may attempt to directly communicate with another endpoint and bypass the security appliance 150. However, such an attempt to circumvent the security appliance 150 may still be detected and prevented.

Figure 6:
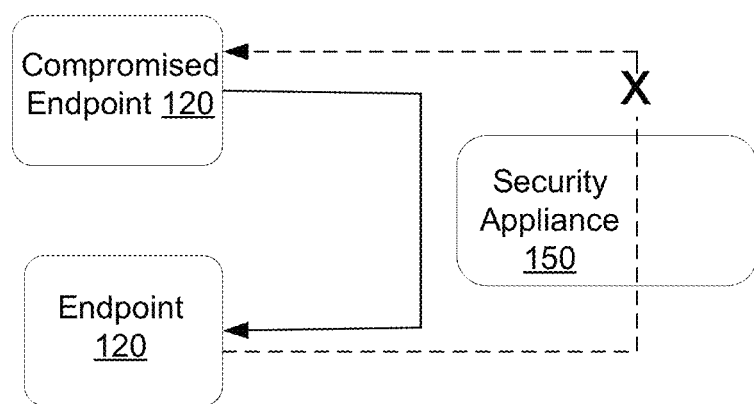
FIG. 6 illustrates how the security appliance may detect compromised endpoints attempting to circumvent the security appliance in accordance with an implementation.

FIG. 6 illustrates an example of how attempts to circumvent protection are detected. A compromised endpoint might, for example, have code in the ransomware that attempts to directly send request messages to another endpoint, bypassing the security appliance 150. However, an uncompromised endpoint will attempt to send its response message to the security appliance 150 as the default gateway. The security appliance 150 determines when it has detected a response from an endpoint directed to another endpoint but for which it has not detected a corresponding request. This discrepancy (a response message but no request message) may be used to identify that a compromised endpoint is attempting to circumvent the protection of the security appliance 150.

Figure 7:
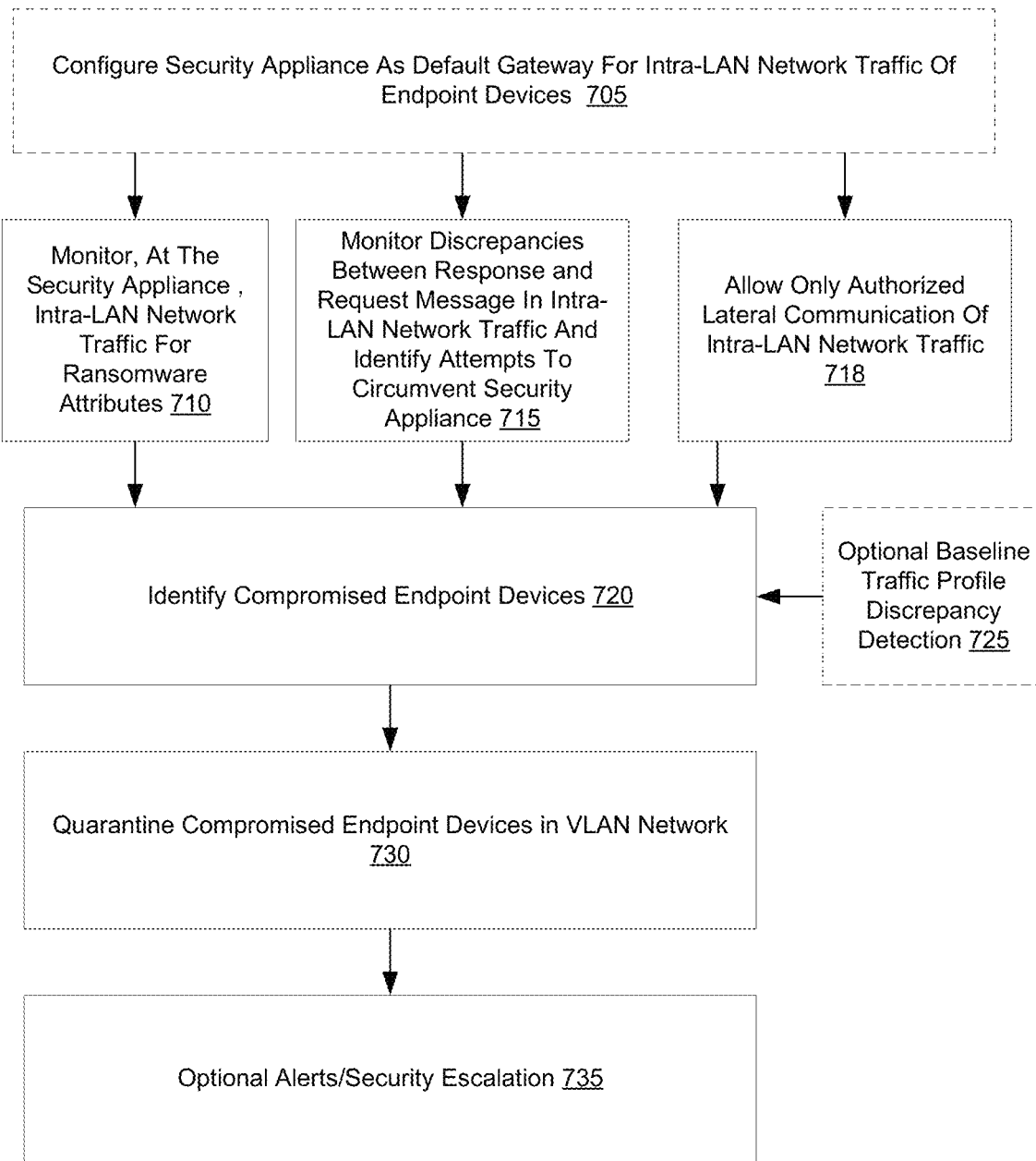
FIG. 7 is a flow chart of an example method for ransomware protection in accordance with an implementation.

FIG. 7 is a flow diagram of a method in accordance with an implementation. In block 705, a security appliance is configured as the default gateway for Intra-LAN network traffic of endpoint device. In block 710, the security appliance monitors intra-LAN network traffic for ransomware attributes. In block 715, the security appliance also monitors the intra-LAN message traffic for discrepancies between response and request messages in intra-LAN network traffic and identify attempts to circumvent the security appliance. In block 718, the method also includes the security appliance allowing only authorized lateral communication of Intra-LAN network traffic. In block 720, compromised endpoint devices are identified based on the outputs of blocks 710 and 715. Optionally, discrepancies with respect to a baseline message traffic profile from block 725 may be considered as an additional factor. In block 730, compromised endpoint devices are quarantined. This may include, for example, placing them on a list of quarantined devices, blocking communication with them, or taking other measures to isolate them. In block 735 optional alerts or security escalation may be performed. Security escalation could, for example, include implementing a security protocol to take a further action to mitigate or minimize the risk of further damage from a ransomware attack.

The security appliance 150 restricts communication in a manner that significantly reduces the attack surface available to the ransomware to exploit vulnerabilities in other endpoints and/or applications and propagate laterally. It detects attempts to circumvent the protection provided by the security appliance. If a compromised endpoint attempts to bypass the default gateway and tries to laterally propagate to another device, this attempt would be detected by the security appliance and appropriate action would be taken. This detection is because the uncompromised endpoint would still send the response packets to the compromised endpoint via the security appliance 150 (due to the /32 default route). The security appliance 150 detects the fact that it has seen a response packet to a request sent by the compromised endpoint, and it alerts the operator in this case. Automatic actions may be taken by the security appliance 150 including quarantining the compromised endpoint so that further lateral propagation is impossible.

Device Health Check Examples

In one implementation, the default gateway can be also used to support monitoring the health of Industrial/OT devices. The default gateway may also be used to collect information on message traffic indicative of potential health problems and downtime associated with individual endpoint devices. For example, if an endpoint device is silent for an abnormally long period of time, it may indicate the endpoint device is down. Similarly, some types of largely random message traffic may indicate a device problem. Thus, while the security appliance 150 may be used to detect message traffic associated with ransomware, it may also be used to detect endpoint device health problems different than ransomware.

Figure 8:
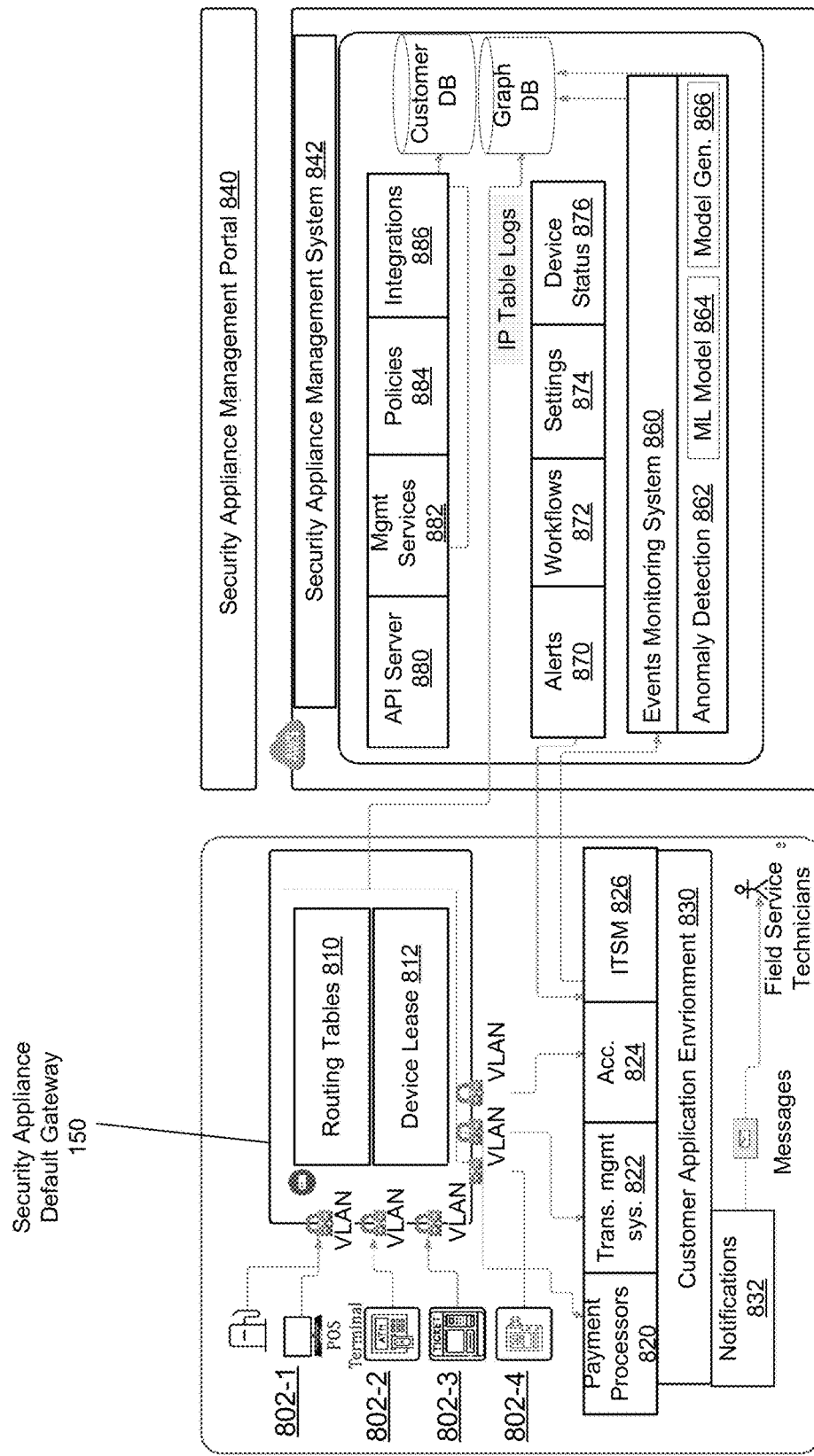
FIG. 8 is a block diagram of a system for using a default gateway to detect potential device health problems in accordance with an implementation.

Referring to FIG. 8 a security appliance 150 may be used to protect device endpoints on a shared VLAN network from lateral propagation of malware and ransomware using a subnet mask comprised of all ones: 255.255.255.255. This results in the security appliance 150 configuring itself as the default gateway for the endpoint by overwriting the router/gateway property in the response. Since each individual endpoint device receives an IP address with a subnet mask of 255.255.255.255, any network communication with other endpoint devices or internet applications needs to be routed via the default gateway.

However, this capability of the security appliance, operating as the default gateway, may also be used to monitor message traffic to identify potential health problems of endpoint devices including downtime of individual endpoint devices.

FIG. 8 illustrates a high-level system architecture to perform behavioral and health analysis that leverages off of the capabilities of the default gateway. The default gateway is used to secure, regulate, and monitor all point-to-point communication. The security appliance, acting as the default gateway, can continuously monitor device specific network communications to provide additional monitoring and reporting capabilities based on collecting data on baseline historical device-to-device network activities. This can be used to track health remote devices and detect any abnormal or missing activity from an established baseline. As an example, in a gas station example, there may be a normal baseline traffic for different devices of a particular gas station based on factors like the time of day, day of the week, and calendar events (e.g., national holidays). Abnormal or missing traffic, relative to normal baseline traffic, provides an indication of health problems of individual devices.

FIG. 8 illustrates an example in which the endpoint devices may correspond to different vendors/services 802-1, 802-2, 802-3, and 803-4. For example, a gas station may have a POS terminal, gas pumps, ATMs, vending machines, and lotto ticket machines. In many end-use applications of devices associated with a given site, there may be historical patterns for message traffic based on time of day, day of the week, month of the year, and calendar events such as national holidays. There may be payment processors, transaction management systems 822, accounting systems, a customer application environment 830, and a notification unit 832 to generate messages to call field service technicians to service devices.

In one implementation, the security appliance 150 is integrated with popular ITSM (Information Technology Service Management) tools 826 to report detected lags, deviation, or complete silence (breakdown) in the known normal operations and communication activities based on the profile of activities built over normal operations. Additionally, in one implementation, a management portal 840 allows the end users to configure specific alerts and monitoring they would like to receive and actions to take to help alert support staff. In some implementations, a score is generated that determines the type of alert that is generated, such as ordinary alert or a critical alert for a service technician to service an endpoint device.

In one implementation, a security appliance management portal 840 is provided along with a centralized management system 842. Depending on implementation details, the centralized security appliance management system 842 could be integrated with the security applicant or be a separate unit, such as operating on a separate server. In some implementations, the centralized management system 842 is a cloud-based service, such as one implemented via Amazon Web Services® (AWS).

In one implementation, the centralized management system 842 includes persistent storage to store information about historical message traffic patterns. An event monitoring system 860 is provided along with an anomaly detection system 862. A machine learning model 864 and model generation module 866 may be provided to learn how to identify anomalous message traffic behavior indicative of potential endpoint device health problems. The management system 842 may include an alerts module 870 to generate alerts for the ITSM 826, a workflows module 872, a settings module 874, and a device status module 876. In one implementation, various services are supported via an API server 880, a management services module 882, a policies module 884, and an integrations module 886 to support integrations with different vendors.

Because the security appliance 150 acts as a default gateway between endpoint devices, the security appliance can be used to monitor traffic, which in turn can be used to detect the health and uptime of the network device. The security appliance 150 provides IP table logs based on routing tables 810 when device leases renew 812. In one implementation, every time an endpoint device initiates a communication, an aliveness flag is checked, the ongoing traffic pattern is analyzed and stored in persistent storage for analysis. This framework can include a silent detection or downtime detection algorithm. For example, the system may detect a failed or shutdown device when the communication completely stops for an abnormally long time, repeats on the same endpoint for an abnormally long time, or exhibits random behavior. In such an event, the operator can be notified via a configured support channel to the field service technician to rectify the problem.

In one implementation, the security appliance and its associated portal is integrated with ITSM solutions such as Service Now® to generate a support ticket and create a pager notification for a field service agent on the call to fix the failed device. Alternatively, in some implementations, a calendar event is scheduled based on the technician's calendar and availability.

In one implementation, the management system 842 learns to proactively detect device failures or detect when a device goes offline. In one implementation, data on the status of the endpoint device is stored in a local database and the system learns the traffic patterns. Learning the traffic patterns helps to avoid erroneous alerts.

As previously discussed, the security appliance may, for example be deployed for customer enterprise/industrial/OT environments and establish a network with point-to-point links with endpoints and servers (by handing out a prefix of all-ones i.e., 255.255.255.255). This results in the security appliance becoming the default gateway for each endpoint within this environment and all east-west (between endpoints/servers) and north-south (between endpoints/servers/internet destinations) to traverse the default gateway. Each network connection is controlled on the default gateway of the security appliance 150. The default gateway collects the routing table information along with timestamp and sends it to the backend. In one implementation, the routing information is synthesized and reduced to pairs of source and destination IP addresses along with the protocol and generation time and is recorded in the graph database. This database collects information from all the devices that are configured to work with the gateway. The system builds the data and learns over time about the typical network connections made and stores in the database to build a model.

In one implementation, a machine learning (ML) model learns the normal behavior of devices in the network graph, such as the frequency of network packets sent and received by each device, the average size of packets, and the duration of network connections. In one implementation, the system may use unsupervised and/or supervised learning techniques such as clustering, density-based methods, and outlier detection to detect anomalies based on deviations from the normal behavior of the device connections.

In one implementation, the management system 842 periodically loads this data to detect any randomness and anomalies. When a device goes silent, the route information becomes stale and is not updated as frequently. The connection time lag continues to increase. Based on the configurations, device alertness level, and frequency of communications, a score is calculated to determine if the device is not working correctly.

In one implementation, multiple historical and current connections with the error responses are considered to perform a time series analysis and predication is made if the device is down to calculate a downtime factor. If the downtime factor is found increased above a certain threshold, an alert policy is checked. The alert policy can include an action to take, or a notification to generate. As per the policy, a workflow is triggered. This workflow loads the system integration and executes multiple actions. As some examples, the actions could include creating a ticket in the ITSM system or sending a pager email to an email alias. In one implementation, the action taken is recorded in the local system for recording and auditing purposes. In one implementation, if the downtime continues and no action is taken, escalation workflow is triggered, and email and phone calls are generated using the configured integrations.

In one implementation, the downtime detection or silent device detection algorithm can be changed using the configurations in the management portal 840. This allows customers to tailor it to their needs. In one implementation, the portal 840 also provides the ability to silence alerts if there is a known device maintenance window. Also, in one implementation the portal 840 permits a user to adjust the alert criteria should, for example, the alert criteria need to be adjusted to be harder or easier in generating alerts. This is a useful capability to tune the performance to quickly generate alerts for down devices without being flooded with irrelevant alerts.

As previously discussed, the default gateway has complete visibility of all network transactions or any deviation from the normal pattern that was established. This provides a unique opportunity to build a pattern based on the normal behavior of the system and check again for any deviations. If any error or lag is detected in typical network transaction flows built over time with the unsupervised learning ability, the system can trigger a monitoring and alerting event. In one implementation, out of the box integrations with the most popular monitoring and incident management systems available in the market. This makes it easy for customers to integrate the monitoring with their own system to achieve comprehensive and centralized monitoring saving time, money, and efforts and getting speed and reduced complexities.

Figure 9:
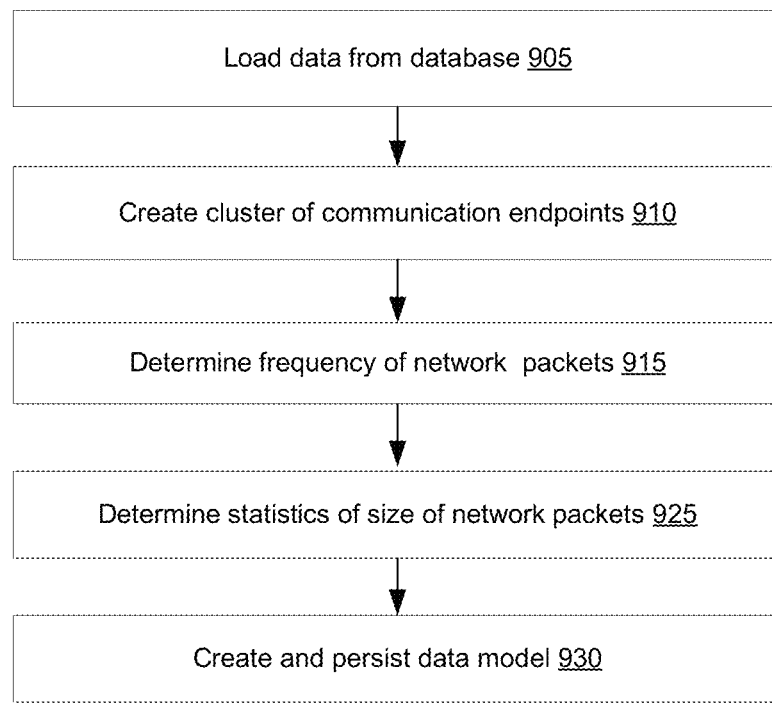
FIG. 9 is a flowchart of a method of generating a model of normal message traffic for an endpoint device in accordance with an implementation.

FIG. 9 is a high-level flowchart illustrating an example of generating a model for use in detecting anomalies relative to baseline network traffic information for endpoint devices. In block 905, data is loaded from a database. In block 910, a cluster of communication endpoints is created. In block 915, a temporal frequency of network packets is determined. In block 925, statistic of the size of network packets are determined. In block 930, the model is created and persisted. The model, in turn, aids in identifying anomalous message traffic behavior indicative of a device health problem.

Figure 10:
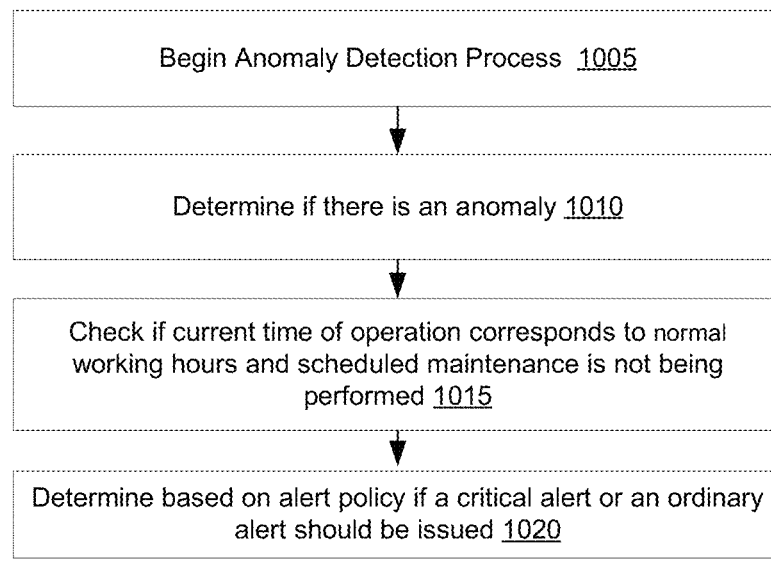
FIG. 10 is a flowchart of a method of detecting anomalies and generating alert of device health problem in accordance with an implementation.

FIG. 10 is a flowchart of an example process for detecting an anomaly and generating alerts. In block 1005, an anomaly detection process begins. In block 1010 a determination is made if there is an anomaly in message traffic. In block 1015, a check is performed if the current time of operation corresponds to normal working hours and scheduled maintenance is not being performed. In block 1020, a determination is made, based on an alert policy, whether a critical alert or an ordinary alert is to be generated.

Figure 11:
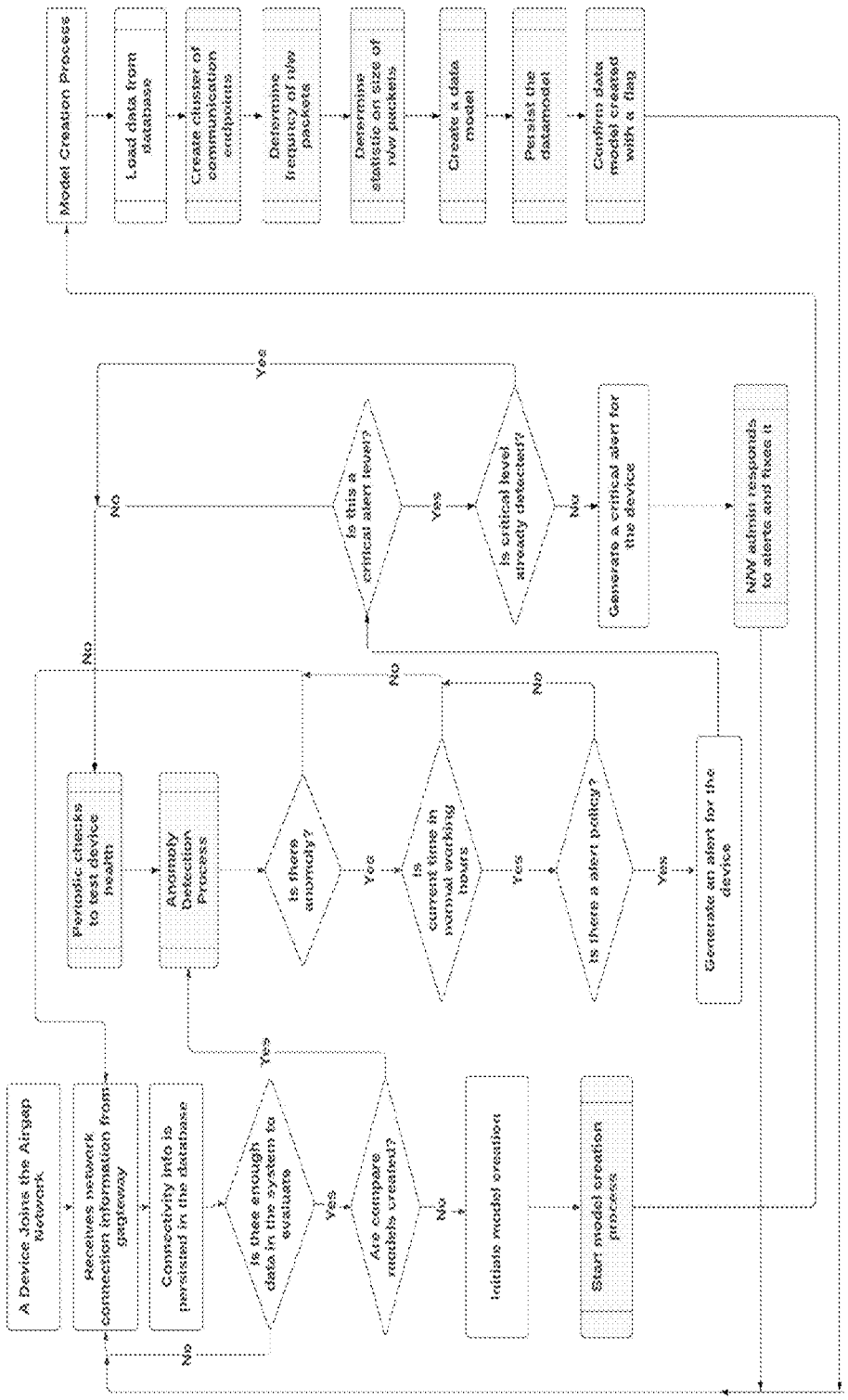
FIG. 11 is a flowchart of a method of detecting anomalies and generating an alert of device health problem in accordance with an implementation.

FIG. 11 is a flow chart of transaction monitoring that includes identifying when new devices are added to a VLAN and other steps to automatically detect anomalies and generate alerts.

Figure 12:
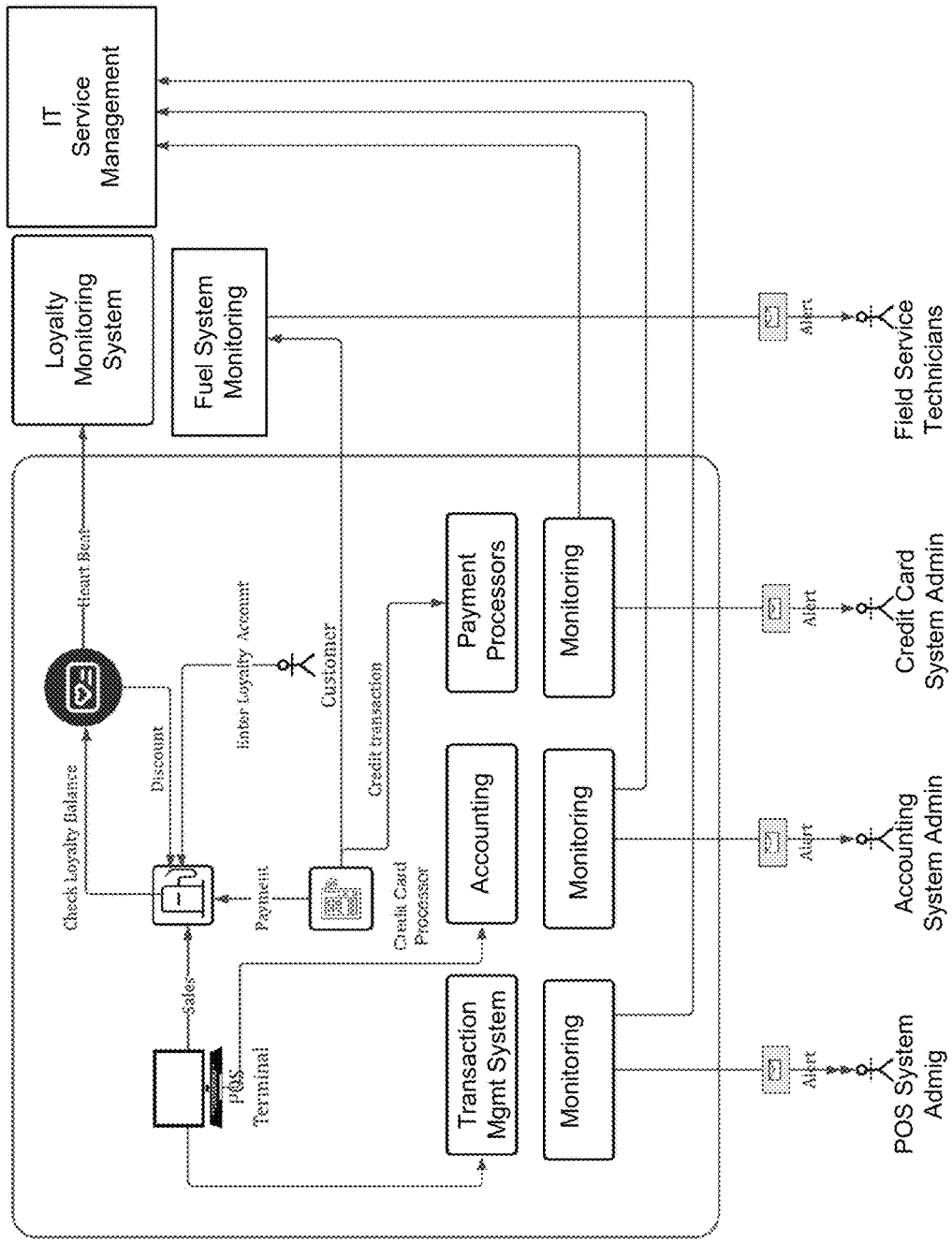
FIG. 12 is a block diagram of a conventional decentralized approach to detecting devices with health problems.

Some of the benefits of using a default gateway to aid in performing centralized management of health checks can be illustrated in regard to advantages over prior art approaches that have a variety of problems performing centralized management of device health. Referring to FIG. 12, conventional VLAN systems may be associated with networked Industrial/OT devices such as fuel pumps, vending machines etc., that get deployed at remote locations that require high uptime and robust monitoring. Downtime in these endpoint devices can cause revenue loss and degradation of customer experience. If a device goes down, a field service technician may be called. However, the management of such endpoint devices is complicated because there may be several different monitoring systems of different endpoint devices. For example, in the example of a gas station, there may be a point of sale (POS) terminal transaction management monitoring/administration, accounting system monitoring, and payment processor monitoring. Monitoring health and uptimes of Industrial/OT devices conventionally requires deploying expensive monitoring tools and vendor specific integrations and platforms. Moreover, many of the monitoring tools require vendor specific knowledge to monitor different toolsets because of legacy, non-standard, and proprietary methods of communication and notifications. Current solutions in the market provide a point to point and a device specific monitoring. Current solutions are very device, vendor and deployment, and technology specific. They also typically rely on agent software in individual endpoint device.

FIG. 13 illustrates a conventional legacy complex monitoring system such as at a gas station, to illustrate some of the problems in the industry. For a typical fuel pump use case, gas pumps need to interact with different enterprise systems to complete a customer's transaction. When a customer walks up to a pump wanting to make a fuel purchase, the pumps must determine if the customer needs to be offered any discount from their loyalty point balance. The pump collects the user account number by prompting the customer for their account number. It sends the account number to a backend loyalty point management system to offer the customer a specific discount. The loyalty account system is usually developed and deployed in-house by the IT team. This internal loyalty system has its monitoring mechanism to track system up time and reports any issues. However, the monitoring is specific to the loyalty system.

Assuming that the customer has enough loyalty points balance to get a discount, the loyalty system returns the assessed discount percentage back to pump. The pump must adjust the price customers pay communicating with the pump payment processor. The pump then proceeds to collect the payment information and authorize the payment with a card processor. This network transaction occurs with an external payment system normally with the credit card provider network. The external payment system implements its own monitoring specific to the card processing function. In most cases integrating the card monitoring requires expertise, time, and efforts to integrate with the enterprise monitoring system. After the purchase is complete, the pump must register the transaction with the backend transaction management system for accounting and inventory purposes. This network transaction happens with the enterprise-wide POS purchase systems developed by a completely different vendor. The accounting system has its own monitoring, but again does not integrate with enterprise-wide monitoring systems. Additional custom efforts are needed to monitor the accounting system and integrate with enterprise monitoring.

Comparing the example of FIG. 8 and FIG. 13, embodiments of the invention provide centralized management and other features for performing health checks. This is particularly advantageous for multi-vendor, multi-device end-use applications.

Alternate Implementations

Other implementations of one or more of these aspects include corresponding systems, apparatus, and computer programs, configured to perform the actions of the methods, encoded on computer storage devices.

These and other implementations may each optionally include one or more of the following features.

In the above description, for purposes of explanation, numerous specific details were set forth. It will be apparent, however, that the disclosed technologies can be practiced without any given subset of these specific details. In other instances, structures and devices are shown in block diagram form. For example, the disclosed technologies are described in some implementations above with reference to user interfaces and particular hardware.

Reference in the specification to "one embodiment", "some embodiments" or "an embodiment" means that a particular feature, structure, or characteristic described in connection with the embodiment is included in at least some embodiments of the disclosed technologies. The appearances of the phrase "in some embodiments" in various places in the specification are not necessarily all referring to the same embodiment.

Some portions of the detailed descriptions above were presented in terms of processes and symbolic representations of operations on data bits within a computer memory. A process can generally be considered a self-consistent sequence of steps leading to a result. The steps may involve physical manipulations of physical quantities. These quantities take the form of electrical or magnetic signals capable of being stored, transferred, combined, compared, and otherwise manipulated. These signals may be referred to as being in the form of bits, values, elements, symbols, characters, terms, numbers, or the like.

These and similar terms can be associated with the appropriate physical quantities and can be considered labels applied to these quantities. Unless specifically stated otherwise as apparent from the prior discussion, it is appreciated that throughout the description, discussions utilizing terms, for example, "processing" or "computing" or "calculating" or "determining" or "displaying" or the like, may refer to the processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The disclosed technologies may also relate to an apparatus for performing the operations herein. This apparatus may be specially constructed for the required purposes, or it may include a general-purpose computer selectively activated or reconfigured by a computer program stored in the computer.

The disclosed technologies can take the form of an entirely hardware implementation, an entirely software implementation or an implementation containing both software and hardware elements. In some implementations, the technology is implemented in software, which includes, but is not limited to, firmware, resident software, microcode, etc.

Furthermore, the disclosed technologies can take the form of a computer program product accessible from a non-transitory computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A computing system or data processing system suitable for storing and/or executing program code will include at least one processor (e.g., a hardware processor) coupled directly or indirectly to memory elements through a system bus. The memory elements can include local memory employed during actual execution of the program code, bulk storage, and cache memories which provide temporary storage of at least some program code to reduce the number of times code must be retrieved from bulk storage during execution.

Input/output or I/O devices (including, but not limited to, keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

Finally, the processes and displays presented herein may not be inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the disclosed technologies were not described with reference to any particular programming language. It will be appreciated that a variety of programming languages may be used to implement the teachings of the technologies as described herein.

The foregoing description of the implementations of the present techniques and technologies has been presented for the purposes of illustration and description. It is not intended to be exhaustive or to limit the present techniques and technologies to the precise form disclosed. Many modifications and variations are possible in light of the above teaching. It is intended that the scope of the present techniques and technologies be limited not by this detailed description. The present techniques and technologies may be implemented in other specific forms without departing from the spirit or essential characteristics thereof. Likewise, the particular naming and division of the modules, routines, features, attributes, methodologies, and other aspects are not mandatory or significant, and the mechanisms that implement the present techniques and technologies or its features may have different names, divisions and/or formats. Furthermore, the modules, routines, features, attributes, methodologies, and other aspects of the present technology can be implemented as software, hardware, firmware or any combination of the three. Also, wherever a component, an example of which is a module, is implemented as software, the component can be implemented as a standalone program, as part of a larger program, as a plurality of separate programs, as a statically or dynamically linked library, as a kernel loadable module, as a device driver, and/or in every and any other way known now or in the future in computer programming. Additionally, the present techniques and technologies are in no way limited to implementation in any specific programming language, or for any specific operating system or environment. Accordingly, the disclosure of the present techniques and technologies is intended to be illustrative, but not limiting.

What is claimed is:

1. A system for monitoring and detecting health and uptime of networked industrial devices, comprising:
    a security appliance implemented using at least one processor and memory, and configure to operate via a network interface utilizing a subnet mask of 255.255.255.255 to establish the security appliance as a default gateway for a plurality of endpoint devices of a Virtual Local Area Network (VLAN) with the default gateway being used to monitor intra-VLAN message traffic for the system to detect lateral propagation of ransomware amongst the plurality of endpoint devices; and
    a management system implemented using at least one processors, memory, and network interfaces, configure to detect anomalies in message traffic of individual endpoint devices, of the plurality of endpoint devices, from historical message traffic behavior to identify health problems of individual endpoint devices of the plurality of endpoint devices.

2. The system of claim 1, wherein the security management system includes a model for learning normal message traffic behavior of the plurality of endpoint devices.

3. The system of claim 2, wherein detecting anomalies included detecting deviations from normal behavior of the plurality of endpoint devices using at least one of unsupervised and supervised learning including clustering, density-based methods, and outlier detection.

4. The system of claim 2, wherein the management system generates a score for calculating an alertness level of an endpoint device based on its configurations, frequency of communications, and historical and current connections with error responses.

5. The system of claim 2, wherein the management system implements a downtime detection algorithm to detect an endpoint device that is down.

6. The system of claim 2, wherein the management system implements a silent device detection algorithm to detect an endpoint device that is silent.

7. The system of claim 1, wherein the management system issues a report to an Information Technology Service Management (ITSM) regarding detected lags, deviation, or complete silence in known normal operations and communication activities of an endpoint device based on a profile of activities built over normal operations.

8. The system of claim 7, wherein the management system in response to detecting anomaly triggers an alert policy to create a ticket in the ITSM system or send a pager email.

9. The system of claim 1, wherein the default gateway sends traffic to the management system for the management system to generate alerts in response to detected lags, deviation, or complete silence in known normal operations and communication activities of an endpoint device based on a profile of activities built over normal operations.

10. The system of claim 1, wherein the management system learns historical message traffic patterns of each of the plurality of endpoint devices and learns to create actionable alerts and avoid generating erroneous alerts.

11. The system of claim 1, wherein the management system collects routing table information for each network connection on the default gateway and synthesizes and reducing it to pairs of source and destination IP address along with a protocol and generation time and records it in a database.

12. A method for monitoring and detecting health and uptime of networked industrial devices, comprising:
    deploying a security appliance in a shared Virtual Local Area Network (VLAN) environment;
    using a subnet mask of 255.255.255.255 to set the security appliance as a default gateway for a plurality of endpoint devices of the shared VLAN environment;
    monitoring, by the security appliance, intra-VLAN communication between the plurality of endpoint devices of the shared VLAN environment to detect lateral propagation of ransomware amongst the plurality of endpoint devices; and
    detecting anomalies in message traffic of individual endpoint devices, of the plurality of endpoint devices, from historical message traffic behavior to identify health problems of individual endpoint devices of the plurality of endpoint devices.

13. The method of claim 12, further comprising learning normal message traffic behavior of the plurality of endpoint devices.

14. The method of claim 13, wherein detecting anomalies included detecting deviations from normal behavior of the plurality of endpoint devices using at least one of unsupervised and supervised learning include clustering, density-based methods, and outlier detection.

15. The method of claim 13, further comprising generating a score for calculating an alertness level of an endpoint device based on its configurations, frequency of communications, and historical and current connections with error responses.

16. The method of claim 13, further comprising implementing a downtime detection algorithm to detect an endpoint device that is down.

17. The method of claim 13, further comprising implementing a silent device detection algorithm to detect an endpoint device that is silent or not actively conducting transactions.

18. The method of claim 12, further comprising reporting alerts to an Information Technology Service Management (ITSM) regarding detected lags, deviation, or complete silence in known normal operations and communication activities of an endpoint device based on a profile of activities built over normal operations.

19. The method of claim 12, further comprising generating alerts in response to detected lags, deviation, or complete silence in known normal operations and communication activities of an endpoint device based on a profile of activities built over normal operations.

20. The method of claim 12, further comprising learning historical message traffic patterns of each of the plurality of endpoint devices and learning to create actionable alerts and avoid generating erroneous alerts.

21. The method of claim 12, comprising collecting routing table information for each network connection on the default gateway and synthesizes and reducing it to pairs of source and destination IP address along with a protocol and generation time, and records it in a database.

* * * * *